United States Patent [19]

Aoki

[11] 4,321,029
[45] Mar. 23, 1982

[54] INJECTION BLOW MOLDER FOR DUPLEX HOLLOW MOLDED ARTICLES

[76] Inventor: Katashi Aoki, 6037, Ohaza Minamijo, Sakakimachi, Hanishina-gun, Nagano-ken, Japan

[21] Appl. No.: 121,684

[22] Filed: Feb. 15, 1980

[30] Foreign Application Priority Data

Feb. 20, 1979 [JP] Japan .................................. 54-18696

[51] Int. Cl.³ .............................................. B29C 17/07
[52] U.S. Cl. .................................... 425/523; 264/513; 425/533
[58] Field of Search ................ 425/523, 533; 264/513, 264/537, 538

[56] References Cited

U.S. PATENT DOCUMENTS

| | | | |
|---|---|---|---|
| 3,868,202 | 2/1975 | Valyi | 425/533 X |
| 3,878,282 | 4/1975 | Bonis et al. | 264/513 |
| 3,947,176 | 3/1976 | Rainville | 264/513 X |
| 3,970,419 | 7/1976 | Valyi | 425/533 X |
| 4,065,246 | 12/1977 | Marcus | 425/533 X |
| 4,105,391 | 8/1978 | Aoki | 425/526 |

*Primary Examiner*—Jan H. Silbaugh
*Attorney, Agent, or Firm*—Fulwider, Patton, Rieber, Lee & Utecht

[57] ABSTRACT

An injection blow molder for manufacturing duplex hollow molded articles has four operation stages: An injection molding state, a heating stage, a stretching and blowing stage, and a mold releasing stage and has 1 neck molds more than the number of stages. The injection molding stage is expanded to include the stopping positions of two adjacent neck molds. In the injection molding stage, an inner parison and an outer parison are separately formed; and in the later stages they are stretched and blow molded to form a duplex hollow molded article.

2 Claims, 8 Drawing Figures

FIG.1
(A1) (A2) (C)
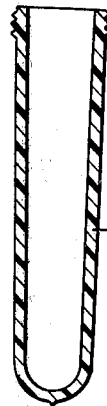
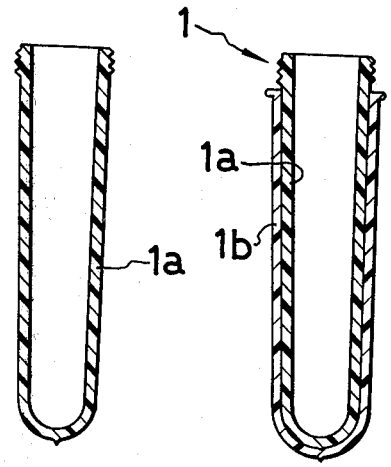
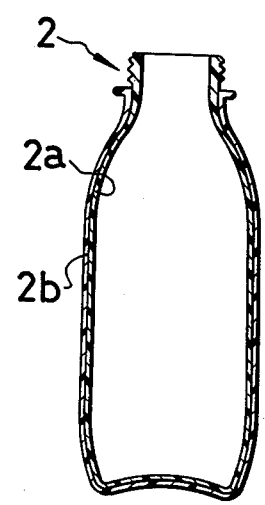

FIG.5
FIG.6
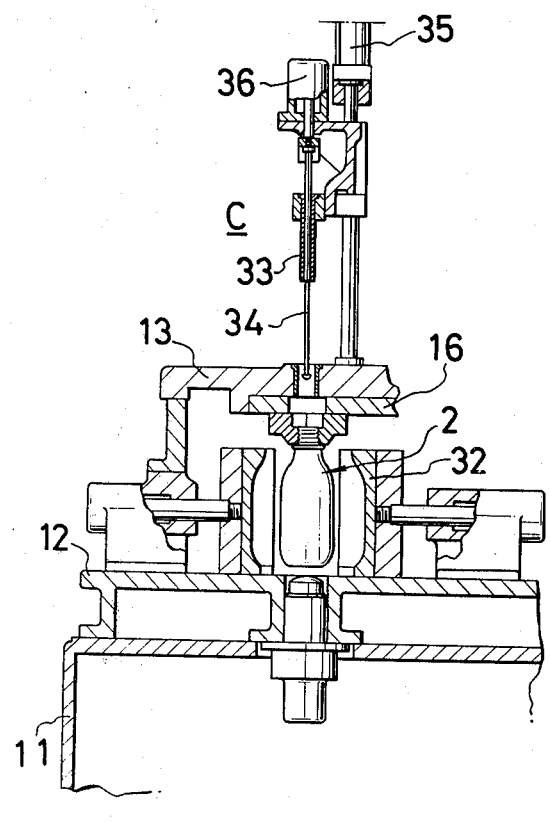
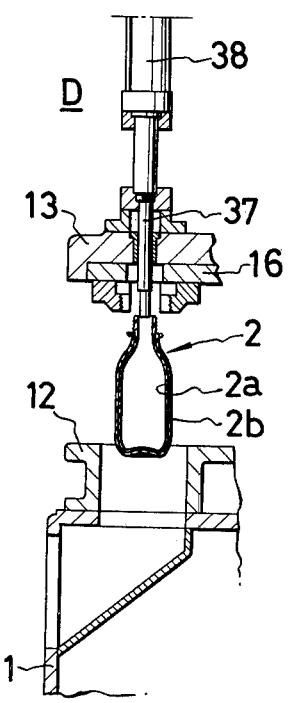

INJECTION BLOW MOLDER FOR DUPLEX HOLLOW MOLDED ARTICLES

BACKGROUND OF THE INVENTION

This invention relates to an improved injection blow molder wherein duplex molding of resin parisons with base or bottom parts and their stretching and blow molding into hollow molded articles can be accomplished continuously.

When an injection molded resin parison with a bottom part is put, on a core, in a blowing mold for blowing air from the core to produce a hollow molded article, it is not, technically, too difficult to form a double layer parison with a bottom and blow mold it, since the core may be used as a transferring member for such a parison. However, in a method for producing a hollow molded article wherein the injection molded parison with a bottom is heated and stretched, the core used in the injection molding can be utilized in the primary molding of a duplex parison with a bottom, but it may not be utilized in a secondary molding without modification since the parison with a bottom is clamped by a neck mold to be transferred. Further, every time the intermittent rotation of the injection molder is interrupted, each process such as injection, heating, stretching and blowing, and mold releasing must be performed. It is impossible to perform the process of the injection molding stage alone in a different molding cycle. Therefore, an injection molder of the type wherein the neck mold is transferred with a parison having a bottom by an intermittently rotated transferring platen is not considered suitable for producing double-layered hollow articles.

However, an injection molder considered structurally inappropriate may still be utilized for producing a duplex hollow article by the blowing method if a duplex injection molder of a parison with a bottom is inserted in the molding cycle from the stages of injection molding to mold releasing.

Thus, the first injection molder proposed was of the so-called four-stage, four-neck mold type in which are disposed four operation stages, that is, an injection molding stage, a heating stage, a stretching and blow molding stage, and a mold releasing stage. In this type of injection molder, a transfer platen intermittently rotates around a support shaft and, in the order mentioned, stops to perform the appropriate process when the neck mold is located at each stage. In order to produce a duplex parison with a bottom using an injection molder of such a structure, a cold parison, injection molded in advance, is attached to the core as an inner parison, and then an outer parison must be injection molded outside the inner parison. However, a special means is needed for attaching the cold parison to the core. In addition, if a hollow duplex molded article of superior quality is required, molten material should not be applied to a cold parison.

BRIEF SUMMARY OF THE INVENTION

Thus, based on a conventional injection molder wherein the molder is of the four-stage, four-neck mold type with each neck mold disposed in each stage, the present inventors developed an injection molder of a new construction which can continuously produce a duplex parison with a bottom and a duplex bottle with a molding cycle similar to the one used in molding a single layered bottle.

Four stages are necessary for performing injection blow molding; an injection molding stage, a heating stage, a stretching and blow molding stage, and a mold releasing stage. However, the number of neck molds may not have to be the same as the number of stages, since each neck mold stops at each stage.

Accordingly, the present inventors devised an injection blow molder of a four-stage, five-neck mold type; the injection molding stage is enlarged to encompass the stopping positions of two neck molds, and each neck mold unit stops at each stage.

As a result, in an injection molder of this type, two neck molds always stop at the injection molding stage, so that each neck mold stops at the injection molding stage twice, thereby molding a duplex parison with a bottom entirely by the injection molding method. Further, with this construction, two pairs of molds can be opened or closed by a common clamping device or separate clamping devices. The intermittent rotation of the transferring platen is performed upon rotation through a smaller angle as compared to the case of four neck molds, and this does not degrade the molding cycle.

With the injection blow molder of this invention, it is possible to continuously produce duplex bottles and other hollow molded articles in a similar manner as in the case wherein a single layered parison with a bottom is injection molded and blow molded with a four-stage, four-neck mold type injection blow molder. The two pairs of injection molds can be opened or closed simultaneously or separately, depending on the resin materials used. Thus it is possible to perform duplex molding with a single resin material, as well as with two different resin materials. By appropriately selecting the resin materials to be used, it is possible to mass-produce molded articles stronger and more airtight than usual duplex hollow molded articles.

BRIEF DESCRIPTION OF THE DRAWINGS

The accompanying drawings illustrate an injection blow molder for manufacturing duplex molded articles in accordance with this invention wherein:

FIGS. 1 ($A_1$), ($A_2$) and (C) are vertical sectional views, showing an inner parison, a duplex parison with a bottom, and a duplex bottle, respectively;

FIG. 5 is a vertical sectional view of the stretching and blow molding stage;

FIG. 6 is a vertical sectional view of a mold releasing stage;

DETAILED DESCRIPTION OF THE INVENTION

FIGS. 1 ($A_1$), ($A_2$) and (C) show a duplex parison with a bottom 1 and a hollow molded article produced by the stretching and blow molding method such as a duplex bottle 2. Symbol 1a denotes an inner parison; 1b, an outer parison, 2a, an inner layer; and 2b, an outer layer.

Figure 2:
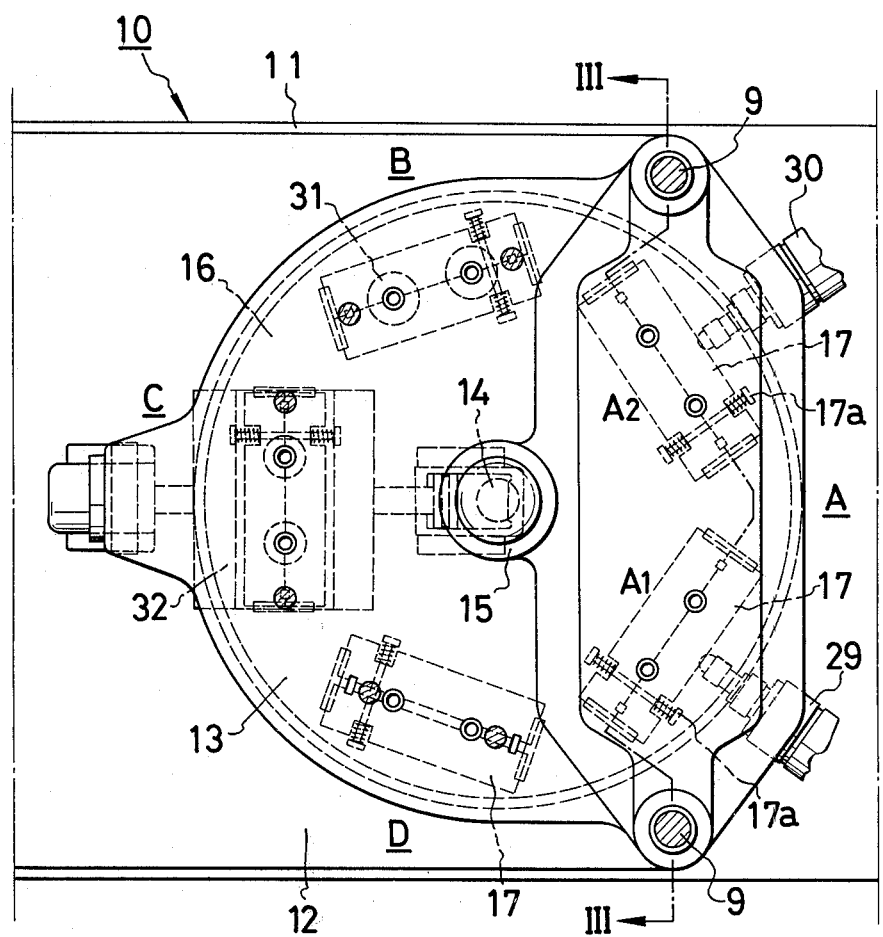
FIG. 2 is a plan view of the injection blow molder according to this invention.

In FIG. 2 and thereafter, an injection molder 10 has a horizontal lower base platen 12 on a machine base 11, and an upper base plate 13 disposed thereabove and parallel thereto at a predetermined distance. The space between these base platens is the molding space.

The upper base platen 13 is horizontally secured to the machine base by two tie rods 9 disposed upright on the machine base at the side of the injection molding stage parallel to each other and separated by a required distance, and by supporting members (not shown) mounted on the stretching and blow molding stage C.

A transferring platen 16, disposed below the undersurface of the upper base platen 13, is intermittently driven by a motor 15 through an angle of 72° around a central support shaft 14. Five neck molds 17 closed by springs 17a are disposed at the undersurface of the transferring platen 16 and are equidistant from one another so that they can be opened and closed radially. Each neck mold 17 stops at the four operation stages of the parison; that is, the injection molding stage A, the heating stage B, the stretching and blow molding stage C, and the mold releasing stage D.

Among these stages, the injection molding stage A includes the stopping positions of two neck molds, while each of the other stages is formed below each neck mold 17.

Figure 3:
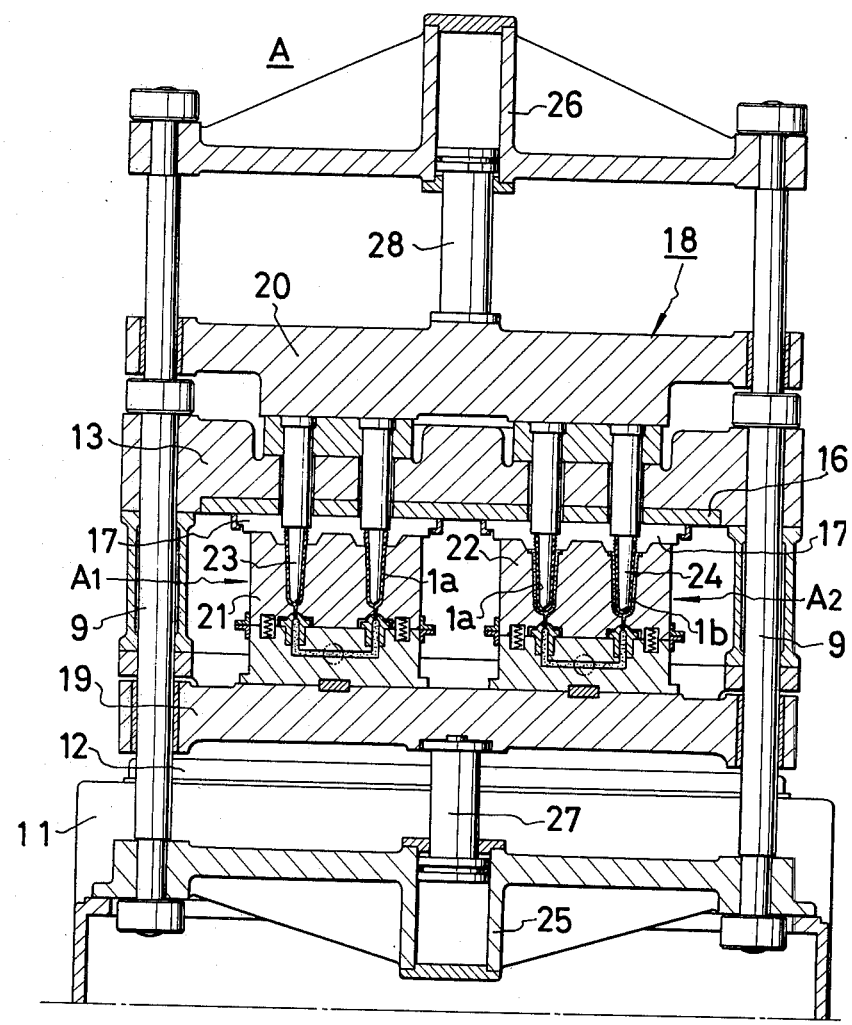
FIG. 3 is a sectional view along the line III—III of FIG. 2.

FIG. 3 shows the injection molding stage A wherein a mold clamping device 18 is vertically disposed so as to enclose the upper base platen 13.

Two pairs of injection molds 21 and 22, one for each neck mold 17, are disposed an lower mold clamping plate 19 and constitute a primary molding part $A_1$ and a secondary molding part $A_2$, respectively. Cores 23 and 24 of the same shape are disposed below the upper mold clamping plate 20 and in a cavity running through the upper base platen 13, the transferring platen 16 and the neck molds 17.

In the injection molding stage A, when each neck mold stops above the injection molds 21 and 22, the injection molds 21 and 22 are closed by a mold clamping cylinder 25 simultaneously with the neck molds 17; then the cores 23 and 24 are inserted in the cavity by the mold clamping cylinder 26. As the molds are closed and strongly clamped, injection molders 29 and 30 inject, by nozzle touch, the molten material; the inner parison 1a is formed around the core 23 in the primary molding part $A_1$; and the outer parison 1b is formed in the secondary molding part $A_2$, thereby forming a duplex parison with a bottom 1. In this case, in the primary molding part $A_1$, the molten material is pressed into the neck mold 17, and therefore the threaded portion is also molded, as shown in FIG. 1 ($A_1$). In the Secondary molding part $A_2$, since the material has already been filled into the neck mold, the molding of the threaded portion is not performed and the outer parison is formed outside the inner parison 1a, as shown in FIG. 1 ($A_2$).

After the injection molding is completed, the mold is opened, the cores 23 and 24 are removed from the inner parison 1a and the duplex parison with a bottom 1, and each of the parisons are clamped by the neck molds 17. As the transferring platen 16 rotates, the inner parison 1a is transferred with its neck mold 17 to the secondary molding part $A_2$, and the duplex parison with a bottom 1 is transferred to the heating stage B.

Figure 4:
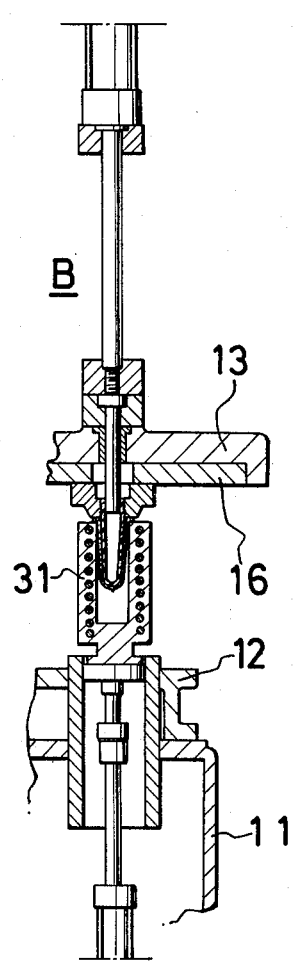
FIG. 4 is a vertical sectional view of the heating stage.

As shown in FIG. 4, the duplex parison with a bottom is heated, in the heating stage B, by a heating furnace 31 above the lower base platen 12. After its temperature is adjusted, the duplex parison is, transferred, after another partial rotation, to the stretching and blow molding stage C shown in FIG. 5.

The stretching and blow molding stage C has a blowing mold 32 on the lower base platen 12 which opens and closes in the radial direction, a nozzle 33 inserted in the parison with a bottom 1 through the upper base platen 13, and a stretching rod 34. After the mold is closed, the parison with a bottom 1 is axially stretched by the stretching rod 34 inserted therein by air cylinders 35 and 36 from the upper base platen 13, and it is stretched in the radial direction along the wall of the blowing mold with air introduced from the nozzle 33. Thus is formed the duplex bottle 2 shown in FIG. 1(C) with the inner layer 2a and the outer layer 2b.

After the stretching and blow molding, the mold is opened and the duplex bottle 2, held by the neck mold it, is transferred to the mold releasing stage D by the transferring platen 16.

A guide rod 37 is included in the mold releasing stage D which may be inserted by an air cylinder 38 through the upper base platen 13 and the transferring platen 16 into the mouth of the bottle held by the neck mold 17. After the guide rod is inserted, the neck mold 17 is opened, and the duplex bottle 2 falls down vertically, guided by the guide rod 37, without adhering to either half of the opened neck mold 17.

As the transferring platen 16 makes another partial rotation, the neck mold 17 is closed and transferred to the primary molding part $A_1$ of the injection molding stage A for commencing another series of injection molding, stretching and blow molding.

Figure 7:
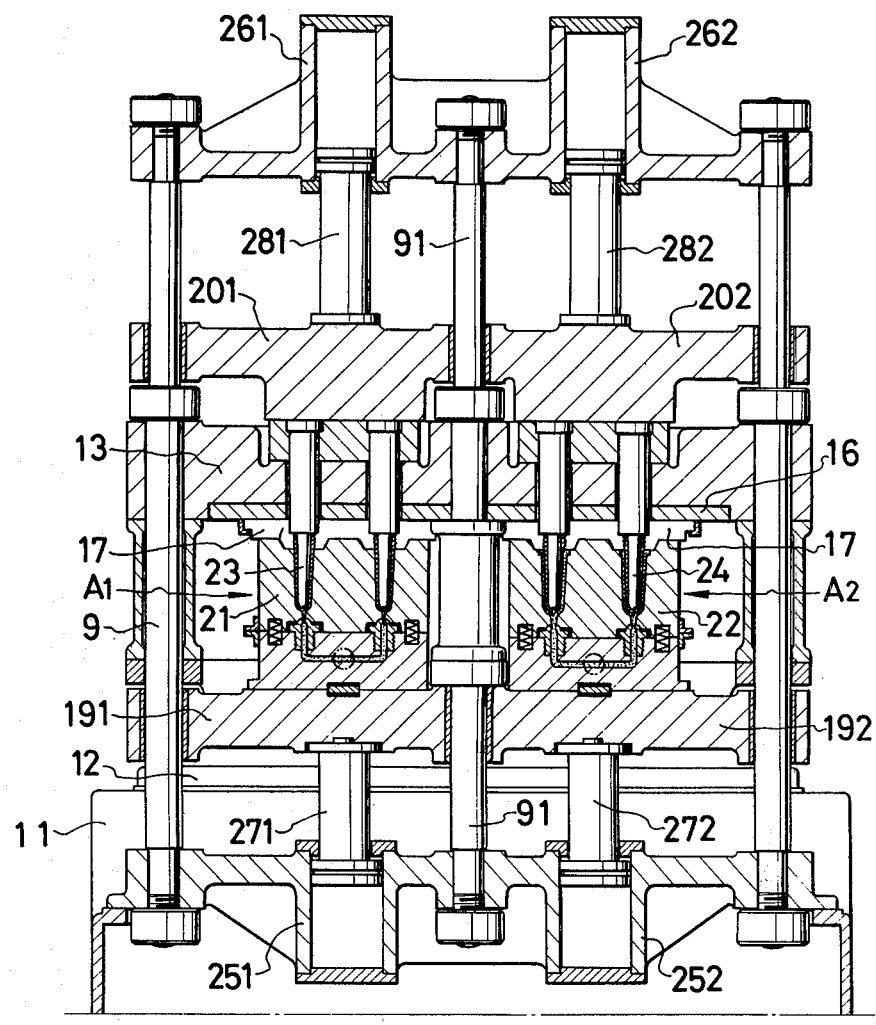
FIG. 7 is a vertical sectional view showing another embodiment of the injection molding stage, similar to the one shown in FIG. 3.

The embodiment shown in FIG. 7 is a case wherein mold clamping mechanisms are constructed separately for the primary molding part $A_1$ nd for the secondary molding part $A_2$ of the injection molding stage A. Parts that are structurally similar to those shown in FIG. 2 are shown with the same reference numerals, and no further description will be made concerning them.

A tie rod 91 is disposed upright at the center of the injection molding stage A, that is, at the central part between the tie rods 9. In the primary molding part $A_1$, a lower mold clamping plate 191 and an upper mold clamping plate 201 are vertically movable and disposed between the rod 91 and the outer tie rod 9. In the secondary molding part $A_2$, a lower mold clamping plate 192 and an upper mold clamping plate 202 are disposed between the central tie rod 91 and the outer tie rod 9 in a similar fashion. Rams 271 and 272 of oil hydraulic cylinders 251 and 252 secured to the lower ends of the tie rods 9 and 91, are respectively, connected to the lower mold clamping plates 191 and 192 for facilitating separate mold clamping.

Similarly, rams 291 and 282 of oil dydraulic cylinders 261 and 262 secured to the upper ends of each tie rod are, respectively, connected to the upper mold clamping plates 201 and 202 for facilitating separate mold clamping, as in the case of the lower mold clamping plates 191 and 192.

The advantage of operating separate mold clamping mechanisms for the primary molding part $A_1$ and the secondary molding part $A_2$ is that the curing time may be selected arbitrarily, depending upon the resin materials used, thus facilitating duplex molding with two different resin materials.

Figure 8:
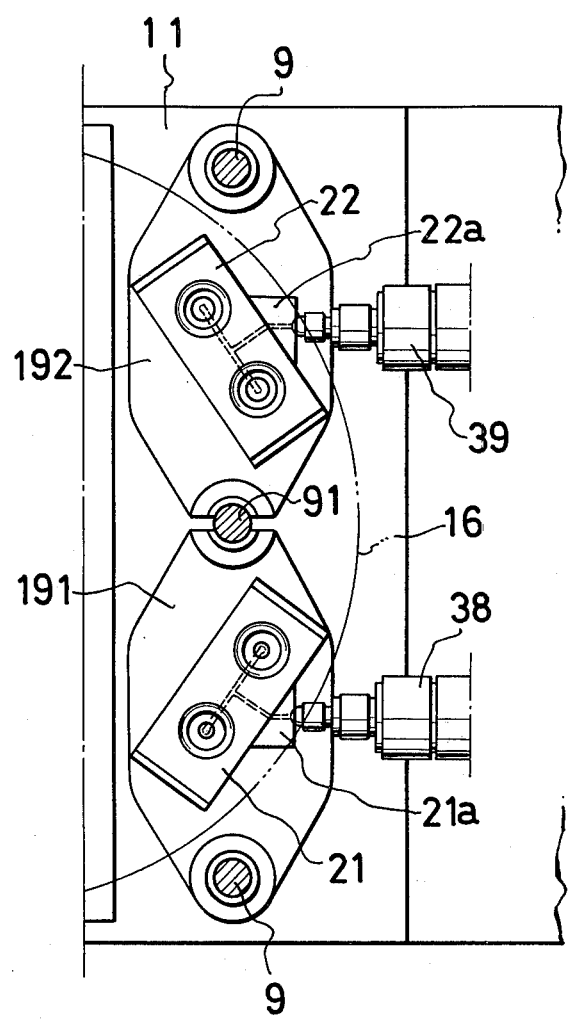
FIG. 8 is a plan view showing the part of the injection molds.

FIG. 8 shows another embodiment of the injection mold wherein nozzle touch portions 21a and 22a protrude from the outer side faces of the two pairs of injection molds. These side faces are oriented in different directions so that the protruding ends are directed in the same direction, and two injection molders 38 and 39 will be parallel for facilitating nozzle touch.

In summary, in this invention, the injection molding stage A includes the stopping positions of two neck molds 17; two pairs of injection molds 21 and 22 are, respectively, disposed for each neck mold 17 so that they may be opened and closed; the primary molding part $A_1$ is formed adjacent to the secondary molding part $A_2$; and upon each stop of the transferring platen 16, the inner parison 1a and the outer parison 1b are injection molded simultaneously for forming a duplex parison with a bottom 1. However, it is to be understood that this invention is not necessarily limited to molding of duplex hollow molded articles. This is because the injection molding of three-layered parisons with bottoms can be accomplished by merely increasing the number of the neck molds and expanding the injection molding stage to include the stopping positions of three neck molds.

What is claimed is:

1. An injection blow molder for molding double-layered or duplex hollow molded articles having:
   a transferring platen disposed horizontally above a generally horizontal lower base said transferring platen having five equidistantly spaced neck molds secured to the undersurface thereof, said transferring platen being arranged for intermittent rotation through a predetermined angle and being disposed at the undersurface of an upper base platen supported horizontally above the lower base by a plurality of tie rods securely connecting the upper base platen to the lower base;
   five operation stages equidistantly spaced on said lower base, said operation stages being a first injection molding stage, a second injection molding stage, a heating stage, a stretching and blowing stage, and a molded product releasing stage, each disposed at a position corresponding to one stopping position of the neck molds on said transferring platen;
   the first and second injection molding stages each having a separate injection mold for cooperating with cores inserted through the neck molds at said stopping positions of said neck molds corresponding to said first and second injection stages, said injection mold at said first injection molding stage forming an inner parison at said first injection molding stage, and said transferring platen being operable to transfer said inner parison to said second injection molding stage for forming an outer parison about said inner parison in said injection mold at said second injection molding stage;
   one of said tie rods being positioned adjacent a first side of said first injection molding stage, a second of said tie rods being positioned adjacent the opposite side of said second injection molding stage, and a third tie rod being located between said first and second injection molding stages, each of said three tie rods including an extension extending above said upper base platen and below said lower base;
   a separate clamping mechanism disposed above the upper base platen at each of said first and second injection molding stages, each of said clamping mechanisms including an upper mold clamping plate guided for vertical movement on said extensions of said tie rods for independently moving said cores into and out of said first and second injection molding stages; and
   a separate clamping mechanism disposed below the lower base at each of said first and second injection molding stages, each of said clamping mechanisms including a lower mold clamping plate guided for vertical movement on said extensions of said tie rods for independently moving said injection molds into and out of said first and second injection molding stages.

2. An injection blow molder for molding duplex hollow molded articles as set forth in claim 1 wherein each of said separate injection molds includes a nozzle touch part protruding therefrom for cooperation with a separate injection molder, said nozzle touch part protruding from said injection mold at said first injection molding stage being inclined in a horizontal plane toward said second injection molding stage by an angle equal to one-half of said predetermined angle, and said nozzle touch part protruding from said injection mold at said second injection molding stage being inclined in a horizontal plane toward said first injection molding stage by an angle equal to one-half of said predetermined angle, whereby said separate injection molders are disposed parallel to each other.

* * * * *

UNITED STATES PATENT AND TRADEMARK OFFICE
CERTIFICATE OF CORRECTION

PATENT NO. : 4,321,029
DATED : March 23, 1982
INVENTOR(S) : Katashi Aoki

It is certified that error appears in the above—identified patent and that said Letters Patent is hereby corrected as shown below:

Abstract, line 3, change "state" to -- stage --;

Col. 3, line 35, change "an" to -- on --;

Col. 4, line 38, change "nd" to -- and --;

Col. 4, line 57, change "291" to -- 281 --'

Col. 4, line 57, change "dydraulic" to -- hydraulic --.

Signed and Sealed this

Fifteenth Day of June 1982

[SEAL]

Attest:

GERALD J. MOSSINGHOFF

Attesting Officer    Commissioner of Patents and Trademarks